United States Patent
Bates et al.

(10) Patent No.: US 7,500,222 B2
(45) Date of Patent: Mar. 3, 2009

(54) TRACKING AND MAINTAINING RELATED AND DERIVATIVE CODE

(75) Inventors: Cary Lee Bates, Olmstead, MN (US); Vadim Berestetsky, North York (CA); Sean Eric Babineau, North York (CA); John Matthew Santosuosso, Olmstead, MN (US)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 10/692,115

(22) Filed: Oct. 23, 2003

(65) Prior Publication Data

US 2004/0153994 A1      Aug. 5, 2004

(30) Foreign Application Priority Data

Jan. 31, 2003    (CA) .................................... 2418255

(51) Int. Cl.
G06F 9/44           (2006.01)
(52) U.S. Cl. ..................... 717/111; 717/112; 717/113
(58) Field of Classification Search .......... 717/110–113
See application file for complete search history.

(56) References Cited

U.S. PATENT DOCUMENTS 3,711,863 A * 1/1973  Bloom ........................ 714/38
5,974,254 A * 10/1999 Hsu ........................... 717/109

OTHER PUBLICATIONS

Fogel et al., OpenSource Development with CVS, 3rd Edition, Published 2000, pp. 1-28, 69-71, 90-116.*
CvsIn, Public Beta Version 4.2.4, Aug. 12, 2003, [retrieved on Mar. 15, 2007, online:https://www.geocities.com/kaczoroj/CvsIn/Menu.html], pp. 1-3.*
Brenda S. Baker, On Finding Duplication and Near-Duplication in Large Software Systems, 1995 IEEE, pp. 86-95.*
Udi Manber, Finding Similar Files in a Large File System, 1994 Winter USENIX Technical Conference, pp. 1-10.*
Berghel et al., Measurements of program similarity in identical Task Enironments, SIGPLAN Notices, V19 #8, Aug. 1984. pp. 65-76.*

* cited by examiner

Primary Examiner—Tuan Q Dam
Assistant Examiner—Zheng Wei
(74) Attorney, Agent, or Firm—Volel Emile; Herman Rodriguez

(57) ABSTRACT

A method and an apparatus within an integrated development environment to increase the efficiency of tracking changes made to source code. The method and apparatus comprise three modes: a constructor mode, a matchmaker mode, and an announcer mode. The constructor first determines what source code/programming constructs are contained within an executable sequence of instructions, evaluates the size of the constructs, and then parses the tokens of the constructs to construct a construct list. The matchmaker determines the degree of similarity between any two constructs in the construct list. If the degree of similarity is sufficient, that is, if the sequence of code between two constructs is so similar that the sections of code may be considered as related and/or derivatives of one another, the matchmaker then determines if any changes made to one section of code may impact the other construct by weighting the changed tokens between the two sets of code. If the change is deemed significant, then the announcer takes over and determines if the developer who owns the related/derived code will be notified that a change has occurred in the first code.

21 Claims, 7 Drawing Sheets

TRACKING AND MAINTAINING RELATED AND DERIVATIVE CODE

TECHNICAL FIELD

This invention relates generally to the field of maintaining computer programs, and more particularly, relates to a tool and a method that could be used in an integrated development environment for matching similar sections of source code. If a change has been made to one of the sections, then the other related or similar sections of code in the integrated development environment are flagged and the developers responsible for those related sections may be notified.

BACKGROUND OF THE INVENTION

Today computer applications are written by many developers on their own workstations generally located at different locations using an integrated development environment (IDE) connected through a network, such as a local area network, a wide area network, even the Internet. Usually, the IDE keeps tracks of the versions of the code being developed and the editing that may have taken place or is occurring to that code. Sometimes, however, when a particular line or lines of code have been changed because of an error or just to make the code more efficient, the change may not be updated in the IDE until the user checks in the changes later. If, however, another developer is using similar code or code that was derived from the first code, she/he may not even be aware of a bug or an increase in efficiency by a change. The IDE may not be aware of the existence of the related or similar code so it could not inform the second programmer of any changes.

Another common phenomenon of software development is the use of software components that are lines of code that execute fairly often for same purpose. For instance, there may be a calendar component that could be used across multiple applications, like scheduling, payroll; there may be a component to print a document in a certain format; there may be a component to create a window; or another to create a hash table. The use of components has increased significantly and is especially pronounced in object-oriented programming (OOP) and other highly modular languages where a single general purpose portion of a computer program may be executed in a number of different situations for different purposes.

With an object-oriented programming language, for example, a program is constructed from a number of "objects," each of which includes data and/or one or more sets of instructions that define specific operations to be performed on the data. A few or a large number of components may be used to create an object, and a large number of objects may be used to build a computer program with each object interacting with other objects in the computer program to perform desired operations. When one object invokes a particular routine in another object, the former object is often said to be calling the routine in the latter object. Some general purpose objects in a computer program may support basic operations, e.g., displaying information to a user, printing information on a printer, storing or retrieving information from a database, etc. Particularly, these generic type of objects are called by many different objects so that a change in the code in one of the objects may benefit other similar or related objects, either from which the edited object or component was derived, or from other objects or components which were derived from the edited object.

Despite the fact that components are intended to be reused, programmers often fail to take advantage of these packaging techniques and, instead, copy code from one component to create a similar one. Finding all of the components or objects which are derived in this way can be incredibly difficult, if not impossible. Examining hundreds or thousands of lines of program instructions is tedious and time consuming, and sometimes variable names change or strings change, so finding related or derivative sections of code is not easily accomplished. Manual review of the code, thus, is fraught with the possibilities that not all related or derived components or objects will be located.

A computer application, including objects, typically has hundreds or thousands of these components, which in turn may be grouped into smaller pieces of source code called program structures or constructs, as is known in the field. A conditional construct specifies several different execution sequences, for example, a CASE statement, an IF statement, a conditional expression in ALGOL. An executable construct specifies one or more actions to be taken by a computer program at execution time and comprise executable statements. A loop construct specifies an iteration in the execution sequence, for example, DO loops in FORTRAN, FOR loops in ALGOL, PERFORM loops in COBOL, DO WHILE loops in PL/I. There are other constructs that exist and still others continually arising as new languages arise, especially as Internet-based applications become plentiful.

Parsing is a very important part of computer programming languages because constructs are comprised of statements, which in turn, are parsed into tokens by a compiler. In any language, including computer languages, parsing means to divide a phrase of the language into small components that can be analyzed. For example, parsing this sentence would involve dividing it into words and phrases and identifying the noun, verb, adjective, direct objects, indirect objects, noun. Computer compilers parse source code written by a developer and translate the source code into object code readable by the machine. Similarly, any applications that processes complex commands and virtually all end-user applications must be able to parse the commands. Parsing is often divided into lexical analysis and semantic parsing. Lexical analysis concentrates on dividing strings into components, called tokens, based on punctuation and other keys, such as in the spoken language, identifying the nouns, verbs, commas, etc. A token may be thought of as the smallest independent unit of meaning within a program as defined by either a parser or the lexical analyzer. Semantic parsing attempts to determine the meaning of the string, for instance, identification of the subject of the sentence, the tense of the verbs, the direct and indirect objects, etc.

There is a need in the industry to help programmers locate related or derived components and objects when editing a particular component or code. There is a further need in the industry to determine if the changes made to one component or object should be applied to the other related or derived/derivative components or objects.

SUMMARY OF THE INVENTION

Thus, the above needs are satisfied by and further advantages and features are offered in an algorithm to improve efficiency of editing source code, the algorithm comprising recognizing that source code has been edited and further identifying a program construct in the edited source code, constructing a construct list of other constructs having similar and/or related code to that which was edited, determining the similarity between the other constructs and the edited construct, and if the similarity is equal to or beyond a threshold of similarity, then notifying the owners of the other constructs.

In order to maintain a reasonable number of other constructs that might be enhanced by a change to the edited construct, the algorithm determines what is a reasonable size and then looks only to those constructs having a reasonable size for placement in the construct list. The tokens of both the edited construct and the other constructs determined to be of a reasonable size are parsed. The parsed tokens of the edited source code are compared with the parsed tokens of the other constructs in the construct list. The parsed tokens may be weighted during comparison so that a degree of similarity can be established, the weights based on type, name, and/or representation. The sum of the weights of the compared tokens is evaluated against a threshold of similarity. The construct list is stored for future use. Preferably, the efficiency algorithm is a machine-implemented process in an integrated development environment.

A method of tracing program changes to determine if two or more constructs in a repository of source code in an integrated development environment are related and/or derived comprises the steps of: identifying a first construct; parsing the first N tokens of the first construct; identifying a plurality of other constructs in the repository; disregarding those of the plurality of constructs in the repository that are too small; identifying those of the plurality of constructs in the repository that are too large; finding subconstructs in the plurality of constructs that are too large; identifying those constructs in the repository and those subconstructs that are of a reasonable size; comparing N tokens of the reasonably sized constructs with N tokens of the first construct; determining a weight for each token based on name, type, and/or representation; summing the weights of each of the N compared tokens; determining that the sum of the weights of the compared token meets or exceeds a threshold of similarity; and determining that the reasonably sized construct having the sum of the weights that meets or exceeds the threshold of similarity is related to the first construct. The method may further comprise identifyfing that source code within the first construct has been edited. A pointer to the reasonably sized construct having the sum of the weights that meets or exceeds the threshold of similarity in a construct list of related construct is stored. Any owner of a construct associated with each of the constructs in the construct list may be notified that one of the constructs in the construct list has been changed.

Also presented herein is an integrated development environment, comprising: a repository of source code comprising programs in the IDE, a constructor to determine that within an edited program, a construct has been edited, a construct list within the repository, the construct list having any constructs in the repository of at least N tokens and smaller than P tokens that are similar and/or related to the edited construct, a parser to parse the edited construct and the similar and/or related constructs, a matchmaker that weighs the similarities between the edited construct and the similar and/or related constructs and determines a degree of matching between the similar and/or related constructs in the construct list based on weights assigned to each of the tokens, and an announcer to announce to any of a plurality of programmers accessing the integrated development environment that the edited construct has been edited and that certain other constructs in the construct list have a degree of matching equal to or exceeding a threshold of the edited construct. The IDE has the ability to list within the construct list all source code derived from the edited construct and/or any of the other constructs in the construct lists that have a degree of matching equal to or exceeding a threshold of the edited construct.

An article of manufacture to enable an electronic processing apparatus to perform the following steps is also part of the invention, the steps being: determining that source code has been edited in an environment of computer program development, determining if the edited source code is within a construct of size larger than M tokens and smaller than N tokens, parsing the construct having the edited source code, finding and parsing other constructs in the environment having a size larger than M tokens and smaller than N tokens, creating a construct list of other constructs in the environment having this size, comparing the tokens between the edited construct and the tokens of the other constructs in the construct list, and determining that the construct having the edited source code is similar to another of the constructs in the construct list. Another step could be to weight the compared tokens based on value, type, and/or representation. The owner of the other construct in the construct list that is similar to the edited construct could be notified of the similarity and of the changed source code in the edited construct. It is contemplated that given an IDE and knowing the programs within the repository of the IDE, the article of manufacture could comprise at least one construct list of related and/or derived constructs within the integrated development environment.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

DETAILED DESCRIPTION OF THE INVENTION

Figure 1:
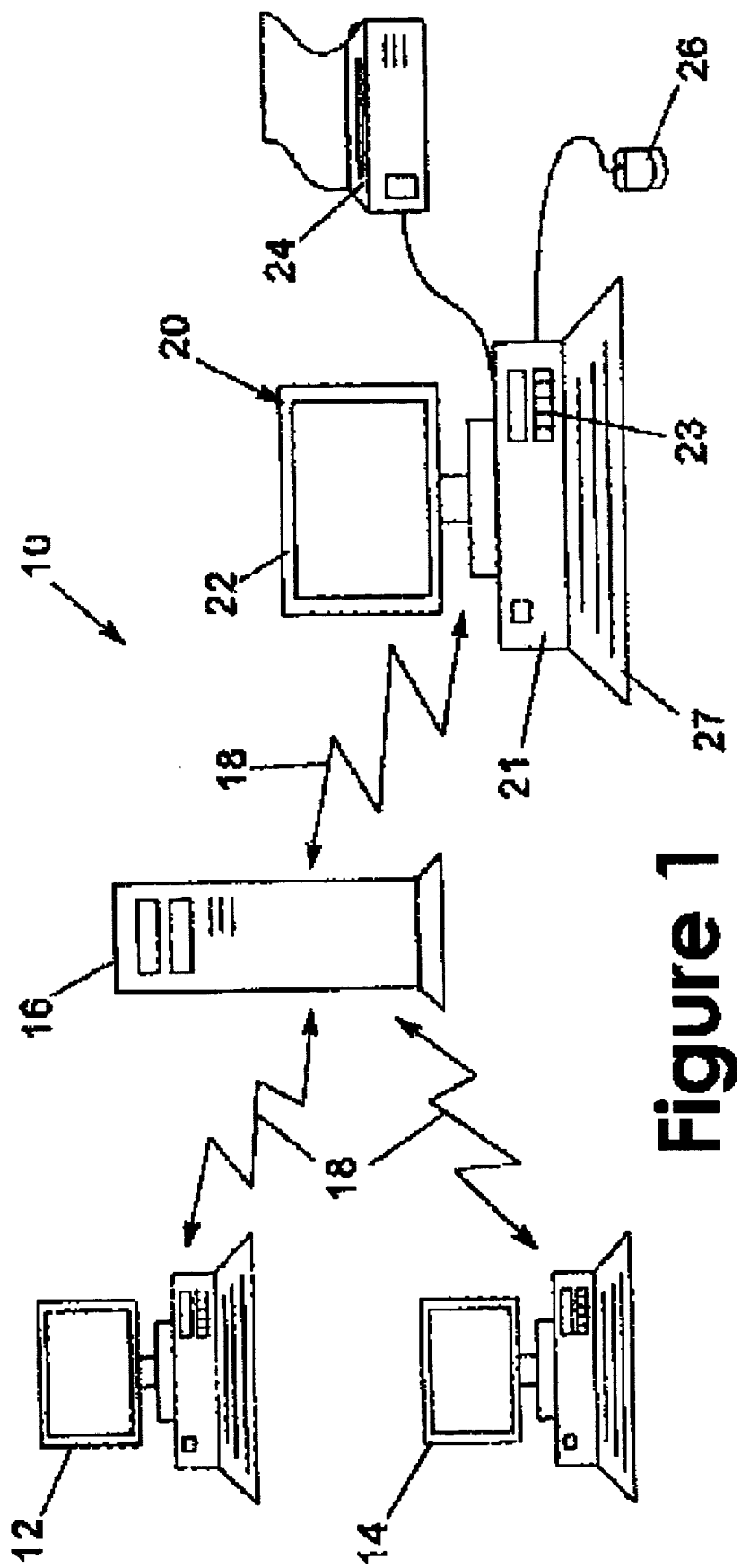
FIG. 1 is a high-level block diagram of a server computer network capable of implementing the preferred embodiment of the invention.

Referring to the drawings, FIG. 1 illustrates an exemplary computer system 10 consistent with the invention. Computer system 10 is illustrated as a networked computer system that includes one or more client computers 12, 14 and 20 such as desktop computers workstations coupled through a network 18 to a server 16. Server 16 could also be a personal computer-based server, a minicomputer, a midrange computer, or a mainframe computer. Network 18 may represent practically any type of networked interconnection including but not limited to local-area, wide-area, wireless, and public networks such as the Internet, and any number of routers and/or hubs connected in between, e.g., a local-area network to a wide-area network to the Internet through a series of routers and/or other servers. Any number of computers and other devices may be networked through network 18, e.g., multiple servers, hand-held devices, etc.

Figure 2:
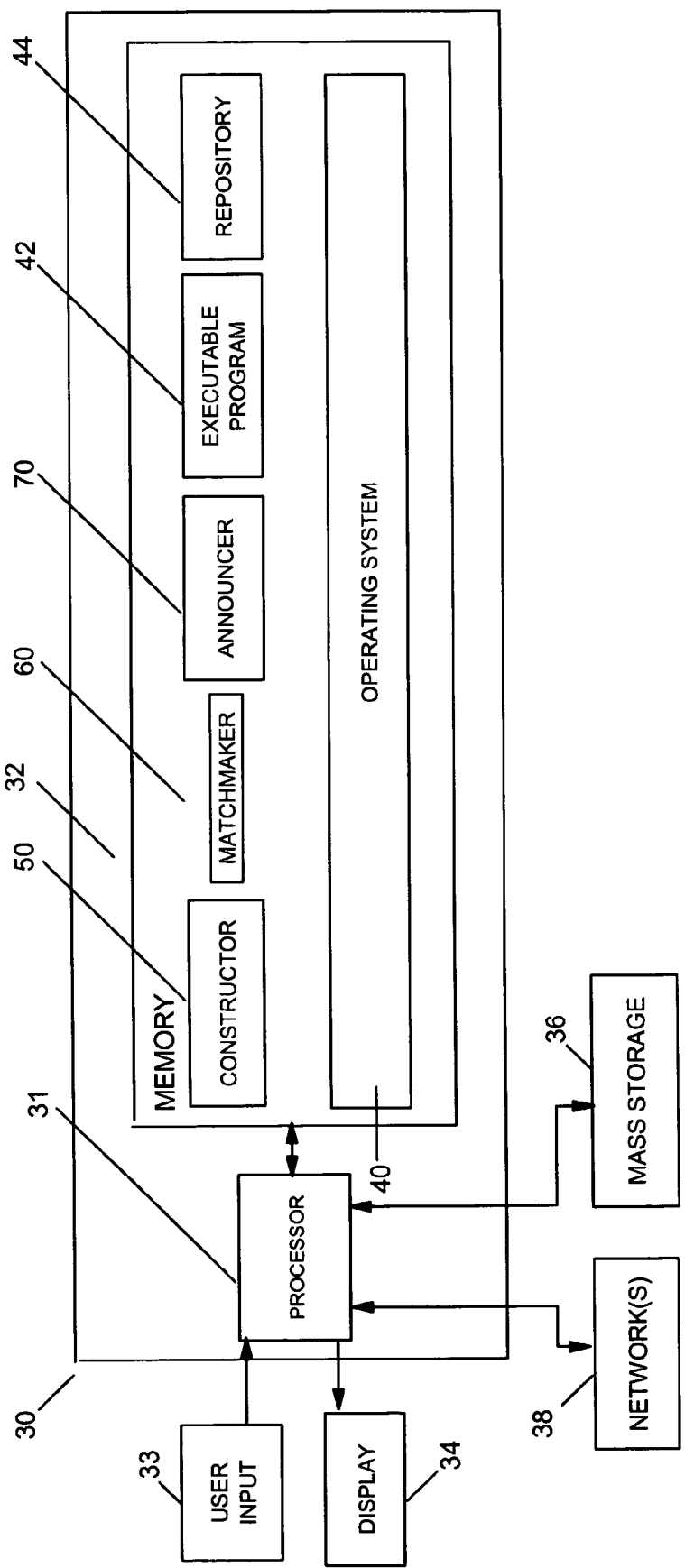
FIG. 2 is a simplified representation of a computer connected to the server network capable of implementing the preferred embodiment of the invention.

FIG. 2 illustrates another exemplary hardware and software environment for an apparatus 30 consistent with the invention. For the purposes of the invention, apparatus 30 may represent practically any type of computer, computer system, or other programmable electronic device, including a client computer similar to computers 12, 14 and 20 of FIG. 1, a server computer, e.g., similar to server 16 of FIG. 1, a portable computer, an embedded controller, a hand-held device, etc. Apparatus 30 maybe coupled in a network as shown in FIG. 1 or may be a stand-alone device. Apparatus 30 will hereinafter also be referred to as a computer although it should be appreciated that the term "apparatus" may also include other suitable programmable electronic devices consistent with the invention.

Computer 30 typically includes at least one processor 31 coupled to a memory 32. Processor 31 may represent one or more processors or microprocessors and memory 32 may represent the random access memory (RAM) devices comprising the main storage of computer 30, as well as any supplemental levels of memory such as cache memories, nonvolatile or backup memories, programmable or flash memories, read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33, e.g., a keyboard, a mouse, a trackball, a joystick, a touch pad, and/or a microphone, among others, and a display 34 such as a CRT monitor, an LCD display panel, and/or a speaker, among others. It should be appreciated, however, that with some implementations of computer 30, e.g., some server implementations, the computer may not support direct user input and output.

For additional storage, computer 30 may also include one or more mass storage devices 36, e.g., a floppy or other removable disk drive, a hard disk drive, a direct access storage device (DASD), an optical drive, e.g., a CD drive, a DVD drive, etc., and/or a tape drive, among others. Furthermore, computer 30 may include an interface connected to one or more networks 38, e.g., a local-area network, a wide-area network, a wireless network, and/or the Internet, among others, to permit communication of information with other computers coupled to the network. It should be appreciated that computer 30 typically includes suitable analog or digital interfaces between processor 31 and each of the components 32, 33, 34, 36 and 38 as is known in the art.

Computer 30 operates under the control of an operating system 40, and executes various computer software applications, components, programs, objects, etc., such as an executable program 42, and perhaps a repository 44, a constructor 50, a matchmaker 60 and an announcer 70, as will be discussed. The constructor 50, the matchmaker 60, and announcer 70 are resident in memory 32 for the purpose of evaluating one or more listings of computer programs, e.g., executable program 42. These and other various applications components, programs, objects, etc., may also execute on one or more processors in another computer coupled to computer 30 via a network 38, e.g., in a distributed or client-server computing environment whereby the processing required to implement the functions of repository 44, constructor 50, matchmaker 60, and announcer 70 may be allocated to multiple computers over a network.

In general, the routines and data bases of the repository 44 and the constructor 50, the matchmaker 60, and the announcer 70 that are executed to implement the embodiments of the invention whether implemented as part of an operating system or a specific application, such as an IDE, component, program, object, component, or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

While the invention has and hereinafter will be described in the context of fully functioning computers and computer systems, those skilled in the art will appreciate that the various embodiments of the repository 44, the constructor 50, the matchmaker 60, and the announcer 70 are capable of being distributed as a program product in a variety of forms and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks, e.g., CD-ROMs, DVDs, etc., among others, and transmission type media such as digital and analog communication links. In addition, various programs described hereinafter may be based upon the application for which they are implemented in a specific embodiment of the invention. It should be appreciated that any particular program nomenclature that follows is used merely for convenience, and thus the invention should not be limited in its use solely to any specific application identified and/or implied by such nomenclature. The exemplary hardware environments illustrated in FIGS. 1 and 2 are not intended to limit the present invention. Indeed, those skilled in the art will recognize that other alternative hardware and/or software environments may be used without departing from the scope of the invention.

An overview of the processes embodying aspects of the invention comprises three modes: a constructor mode, a matchmaker mode, and an announcer mode. The constructor first determines what constructs are contained within an executable sequence of instructions, evaluates the size of the constructs, and then parses the tokens of the constructs to construct a construct list. The matchmaker determines the degree of similarity between any two constructs in the construct list. If the degree of similarity is sufficient, that is, if the sequence of code between two constructs is so similar that the sections of code may be considered as related and/or derivatives of one another, the matchmaker then determines if any changes made to one section of code may impact the other construct by weighting the changed tokens between the two sets of code. If the change is deemed significant, then the announcer takes over and determines if the developer responsible for, or in the vernacular of software developers owns, the related/derived code should be notified that a change has occurred in the first code.

Figure 3:
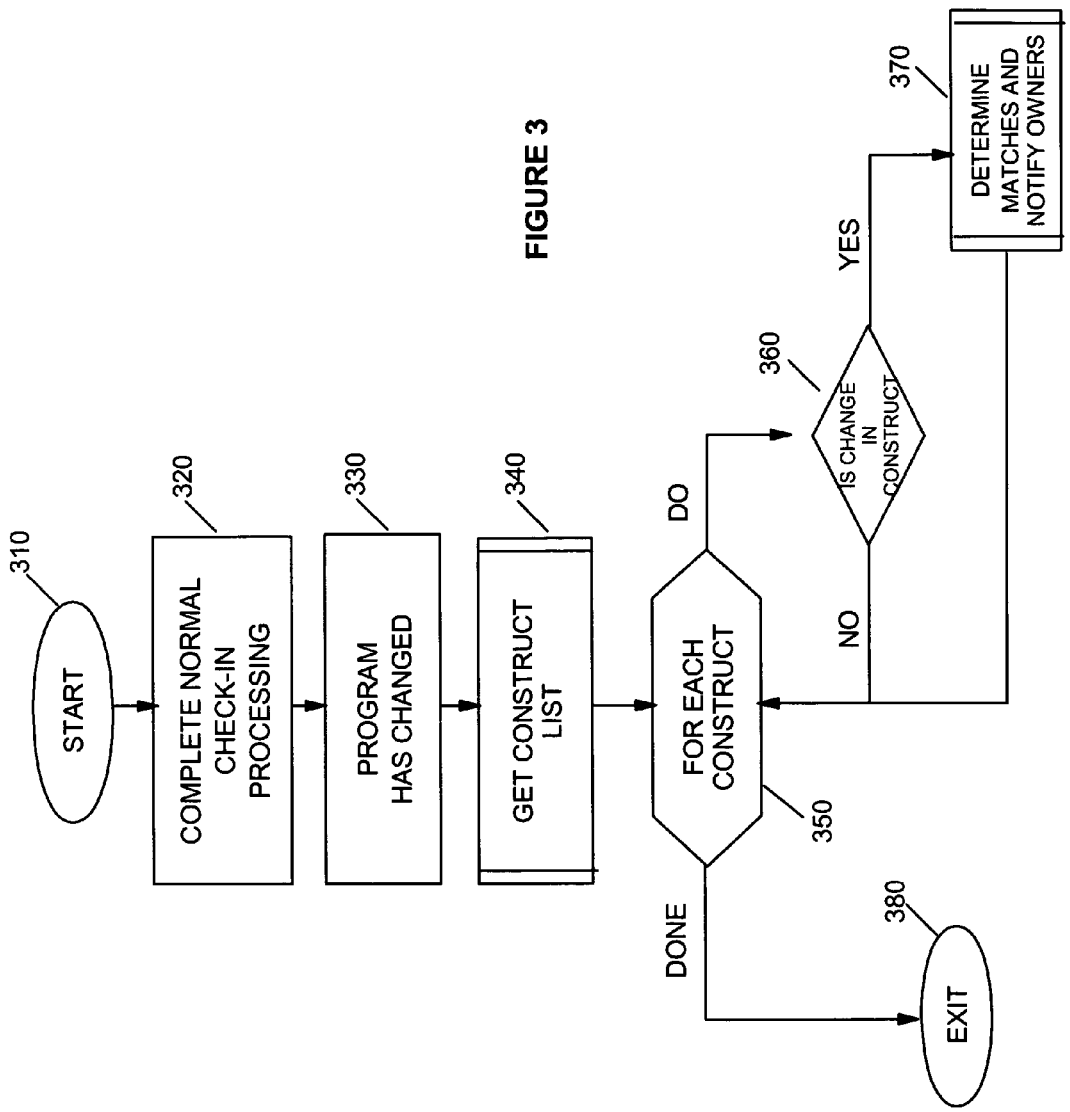
FIG. 3 is a high level flowchart by which changes made to code in a component or object can be communicated to owners of related or derivative components or objects in accordance with one aspect of the invention.

With respect to FIG. 3, there is a high level flow diagram of an application, such as an IDE, that has a repository, a constructor, a matchmaker, and an announcer. Beginning in block 310, the repository has recorded that a section of source code has been checked out and has been edited by a developer. Preferably, the repository is part of an IDE that has been modified to accommodate the information used by the invention as described herein. Upon saving the changes, the developer resubmits the changed code to the repository that stores the changed code and records the developer and time/date stamp and any other pertinent information as normal and unlocks the code so others can use it, as in block 320. In block 330, the constructor has determined that the developer made changes to the code, thereupon the constructor retrieves a construct list as in block 340. The constructor then reviews every construct in the revised code, step 350, and determines if changes had been made to that construct under review, as in step 360. If so, then the matchmaker proceeds to determine if the changed construct is included in any other related or derivative sections of code in the same application or other applications in the repository. If so, as in step 370, the announcer notifies the developers responsible for the related or derivative section that changes had been made to a similar piece of code, and display the changes using, for instance, a graphical user interface.

Figure 4:
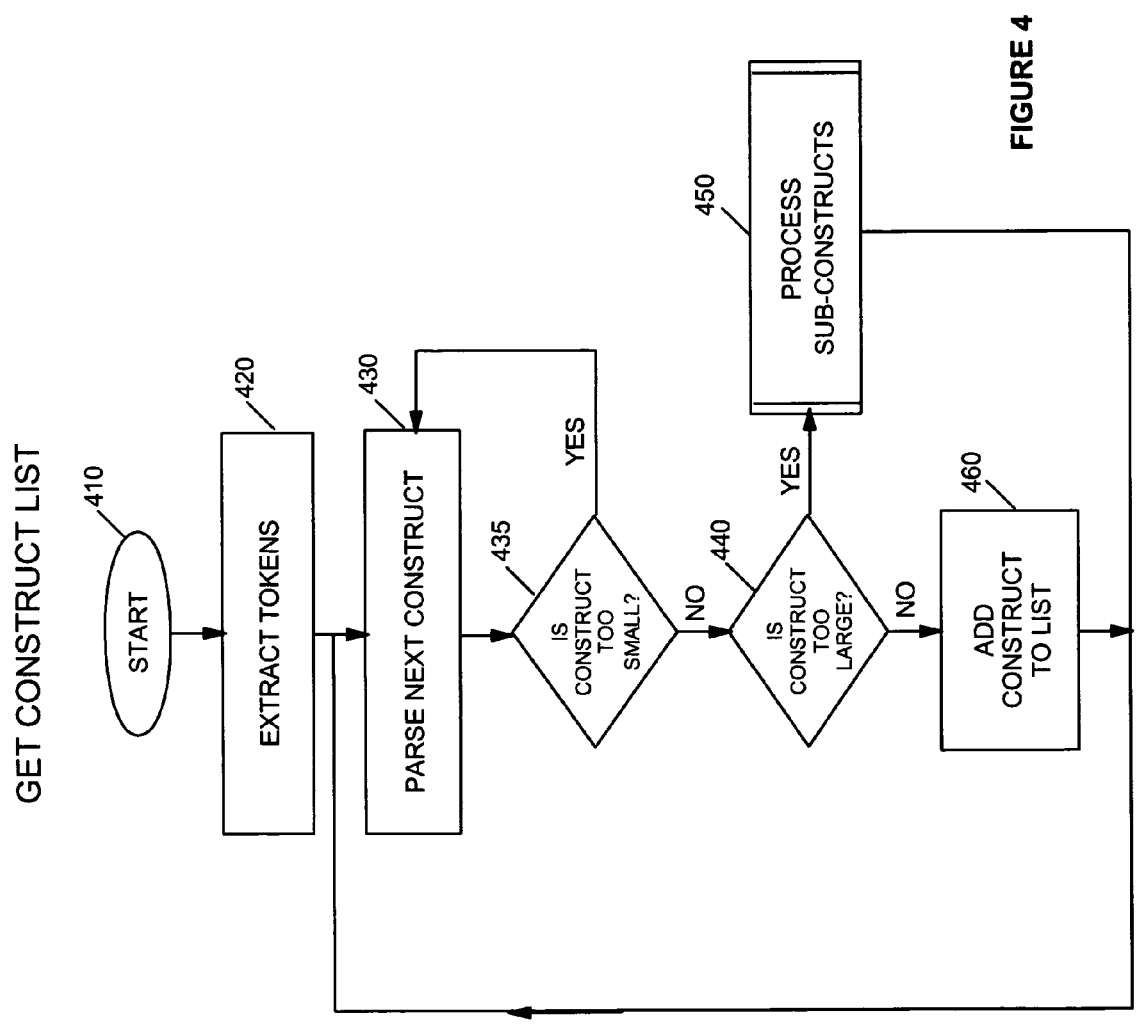
FIG. 4 is a high level flowchart of a method of creating a construct list of constructs having a reasonable size in accordance with an aspect of the invention.

FIG. 4 further elucidates the process outlined in step 340 of FIG. 3 of obtaining the construct list. From start at block 410, the constructor extracts tokens from the changed construct/portion of the code as in step 420. In step 430, the next construct in the construct list is parsed. The method determines if the construct is a workable size in the blocks 435 and 440. In block 435, the constructor checks if the construct is too small and the size of the construct is below a minimal threshold, then it is not considered. Actually, considering the size of the construct for purposes of comparing with other constructs is somewhat of an art. If the construct is too small, such as a simple if a$^{10}$, then the construct list would be too large, there would be too many matches, and system of matching herein would not be useful. On the other hand, if the construct is too large, e.g., perhaps hundreds of lines of code including several other constructs, then the constructor might not be able to identify any similar or derived code. So, the constructor uses a configurable threshold value to set a minimal size for the matching code segments. For instance, some embodiments may set this minimal size to be fifteen tokens. To complete the inquiry, in step 440, the constructor determines if the construct is too large. If so, then the larger construct is partitioned into its smaller constructs as in block 450. If, however, the construct is of a reasonable size, as in step 460, the construct is added to the list of constructs.

Figure 5:
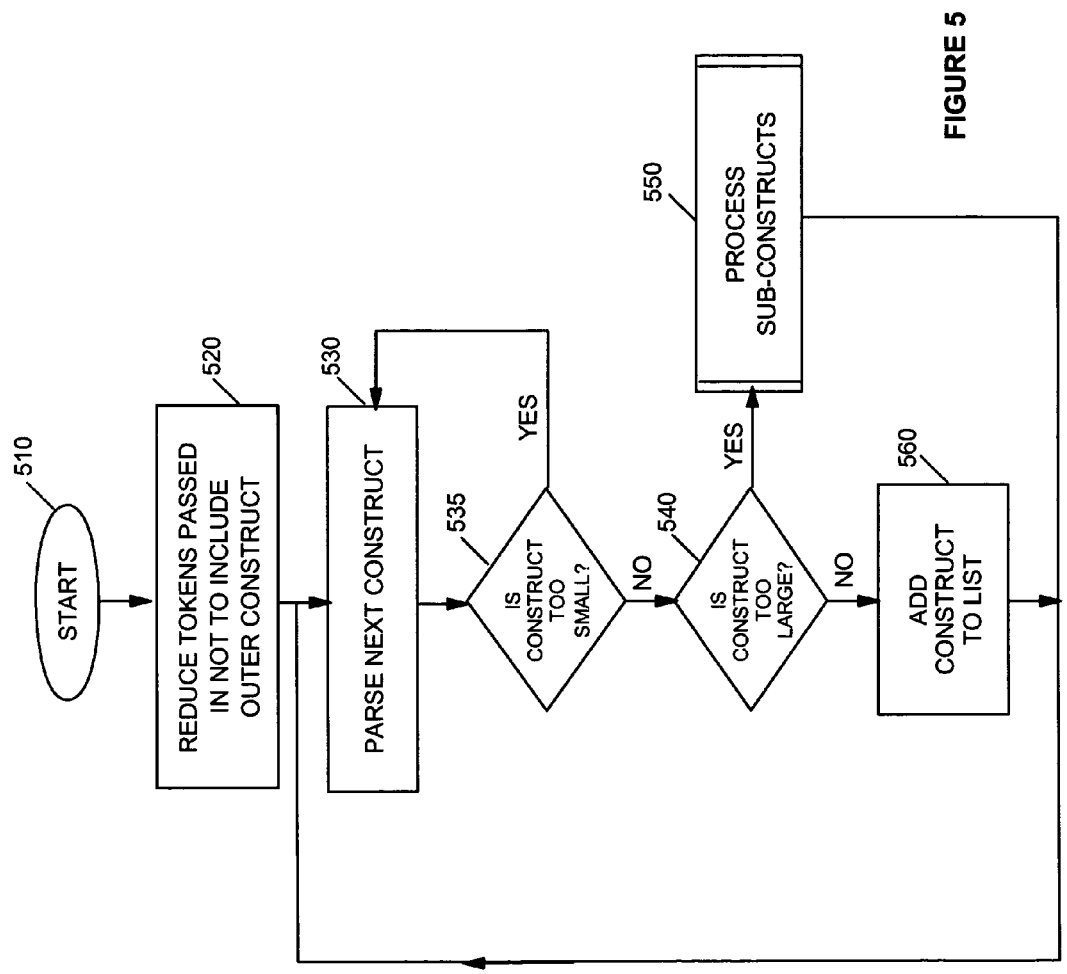
FIG. 5 is a high level flowchart of a method that is capable of determining if a related or derivative object or component is contained within a larger program construct in accordance with an aspect of the invention.

FIG. 5 is very similar to FIG. 4 because the constructor then evaluates the smaller constructs embedded in the larger constructs to determine if they should be included in the construct list. At this point, however, the tokens are simply passed into the process of FIG. 5. At step 520, the constructor reduces the number of tokens parsed so that the larger constructs are not included. Again, at steps 535 and 540, if the sub-construct is a reasonable size, it is added to the list of constructs, step 560.

Interestingly enough, FIGS. 4 and 5 illustrate examples of the reusable code or components. Assume that the code of block 530 in FIG. 5 was derived from or copied from the code associated with the block 430 in FIG. 4. A developer may change the code associated with block 430 in FIG. 4, but may not be concerned with the code associated with block 530 in FIG. 5. Another developer has responsibility for the code in block 530. Indeed, the developer of block 430 discovered a major bug or error in the code and wishes to notify any other developer who is using either that code or other code derived from or copied from the code of block 430. The techniques described herein achieves those results automatically, so that the owner of block 530 could be notified of the changes to the code associated with block 430.

Figure 6:
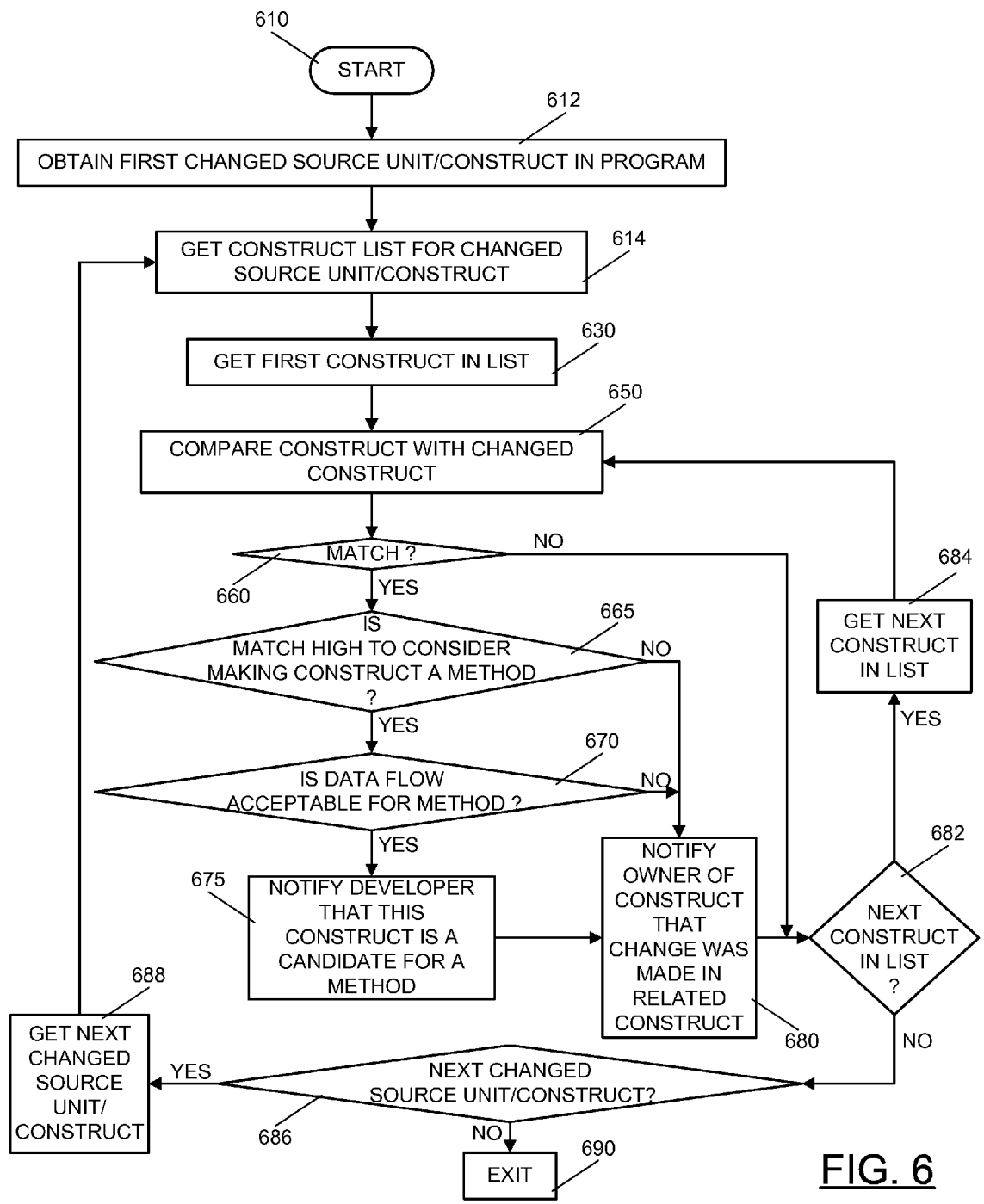
FIG. 6 is a high level flowchart of an example by which candidate program constructs can be evaluated to determine if they are indeed related and derivative, and if so then notifying the owner of the related/derivative components or objects that a change has been effected in accordance with an embodiment of the invention.

With reference to FIG. 6, once the list of constructs has been identified, the matchmaker reviews those constructs similar to or related to or derived from the changed construct to determine if any of the constructs match with the construct that has changed. Match is a relative term and can be varied according to the tokens within the construct as will be further discussed. From start at 610, each source file is further evaluated, as in steps 612, 686 and 688. For example, after obtaining the first changed source unit or construct in a program (step 612) and scrutinizing it (see steps 630-682) then the next changed source unit or construct in the program will be obtained and scrutinized (see steps 686, 688 and 614). If there is not a next changed source unit or construct in the program, then the process exits (steps 686 and 690). The matchmaker looks for sections of the same or similar code within the various source files, or even within a single source file. The source files examined to find these sections may be all the parts in a particular component, all the parts in a particular software product, or all the parts that exist in a particular source repository. For each source unit, its construct list is retrieved, as in block 614, and for each construct in the list, steps 630, 682 and 684, the matchmaker will determine as in step 650 if there is a match as in step 660, i.e., if the construct under evaluation is so similar to the code that was changed. It has been noted by the inventors that if there a high degree of matching, if there is minimal data flow into and out the construct, and if there are enough of these matching constructs, then a developer may wish to consider changing the construct to a method, such as in object oriented programming. To practice these teachings, then, at step 665 there is an inquiry if the match is high enough to consider creating a procedure or a method. If yes, then at step 670, the constructor will examine the data flow and determine if the data flow in/out of the construct is acceptable for a method or procedure. If so, then at step 675, the user is notified that she/he might increase the efficiency of the code if they wrote a method or procedure having the same function/code as the construct under evaluation. Then, the owner is also notified in step 680 that the matching derivative or related code has changed. The matchmaker may determine a match exists using at least two different techniques.

In a first matching technique, a language parser parses the source code into a stream of tokens. The matchmaker uses a sequence of tokens from the changed code, such as from the beginning of the construct though the sequence need not necessarily be at the top level or the beginning of a construct. The tokens of the changed code are compared one by one to the tokens of the code under considerations as the sequence of tokens is slid along the code under evaluation. The matchmaker may then attribute a weight to the differences between the tokens to determine the degree of matching. If enough sequential matching tokens have been found, the two sections are determined to be related.

Figure 7:
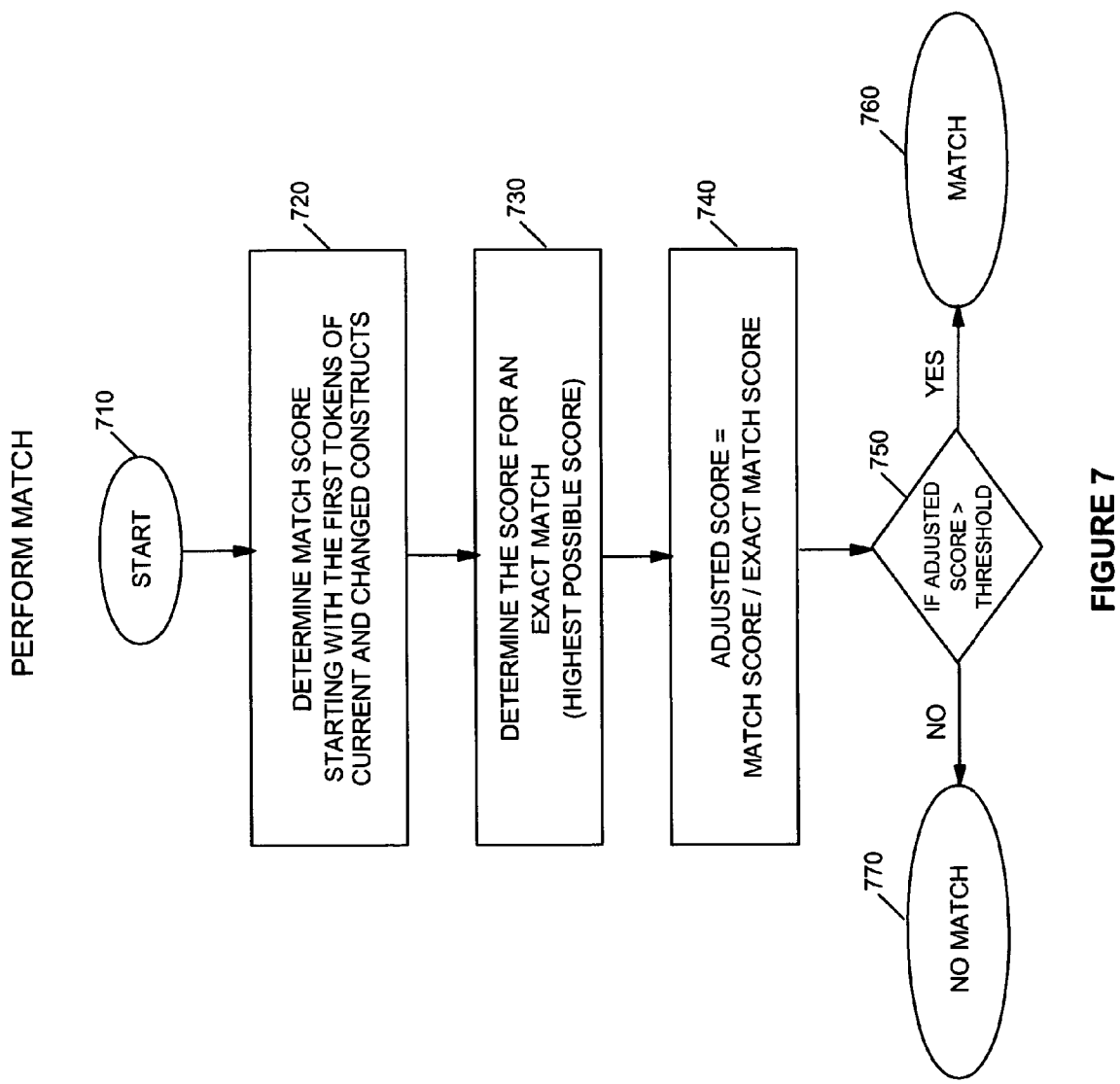
FIG. 7 is a simplified flow chart of the process which may be used to determine if a construct within a component or objects matches another construct in accordance with features of the invention.

The second technique is outlined with respect to FIG. 7. To determine if the construct under evaluation matches with the construct that contains the changed code, the matchmaker starts with a sequence of tokens in the construct under evaluation and the changed code, as in steps 710 and 720. The matchmaker determines the ideal matching score, for instance, the sum of the number of tokens that agree if there were an exact match, as in step 730. The matchmaker then compares the code to obtain the actual score. The matchmaker may then adjust or normalize the score, as in step 740, be dividing the actual score by the exact match score. If the adjusted score is greater than or equal to some threshold value, as in step 750, a match is determined as in step 760. If not, then in step 770, there is no match.

The degree of matching is important because even though variable names and types may have changed between different constructs, the function within the code or construct remains unchanged. For identifier tokens, such as variables, constants, and literals, an exact match might score a full match point; however, tokens such as these may also be considered to match if they have a different name but are the same data type as their counterparts. In this case, rather than registering a full match some lesser amount would be registered as matching, meaning that a longer matching string might be required in order to flag the sections as related. The matchmaker thus has the capability to assign a weighting factor that could be set by a developer or the IDE for the variable/type naming. The parser may generalize the variables by type or makeup of the type.

| TOKEN KIND | MATCH KIND | SCORE |
|---|---|---|
| Variable Token | Name AND Type | 1. |
|  | Type Only | .75 |
|  | Name Only | .5 |
| Literal Token | Type AND Value AND Representation | 1. |
|  | Type AND Value | .9 |
|  | Type | .5 |
| Constant | Name AND Type AND Value | 1. |
|  | Type AND Value | .9 |
|  | Name AND Type | .75 |
|  | Type | .5 |

Given a weighting scheme such as the one above or a different one, the matchmaker determines the degree of matching or similarity. Consider code A below that was changed. The constructor determined that the code of B was also a construct and placed it into the construct list. The matchmaker now compares A and B to determine the degree of matching by parsing and weighting the tokens with the factors.

| A | B | | |
|---|---|---|---|
| for(i=0; i < 5; i++) | for(i=0; i < 5; i++) | | |
| { | { | | |
| j = j +a[i] + b; | ab = ab +a[i] + 5; | | |
| } | } | | |
| A | B | Scores | |
| for | for | 1 | |
| ( | ( | 1 | |
| i | i | 1 | |
| = | = | 1 | |
| 0 | 0 | 1 | |
| ; | ; | 1 | |
| i | i | 1 | |
| < | < | 1 | |
| 5 | 5 | 1 | |
| ; | ; | 1 | |
| i | i | 1 | |
| ++ | ++ | 1 | |
| ) | ) | 1 | |
| { | { | 1 | |
| j | ab | .75 | Variable Type Match |
| = | = | 1 | |
| j | ab | .75 | Variable Type Match |
| + | + | 1 | |
| a | a | 1 | |
| [ | [ | 1 | |
| i | i | 1 | |
| ] | ] | 1 | |
| b | 5 | .75 | Literal variable type match |
| ; | ; | 1 | |
| } | } | 1 | |
| | | 24.25 out of 25, or .97 TOTAL SCORE | |

Other weighting schemes used by the matchmaker could, for instance, determine that code does not match because of a differently-named variable or type name, or determine that the code is an exact match if there is an equivalent variable or type name to be an exact match, or consider compatible variable types to be equivalent for the purpose of matching. An example of how a match can be determined is presented by the coded process below.

```
#include <stdio.h>
int determine_match_score(char *c1, char *c2)
{   int res[3];
    int score; int temp, i; if (*c1 == 0 || *c2 == 0) return 0;    for (i = 0; i < 3; i++) res[i] = 0;
    if ( *c1 == *c2 ) /*COMPUTE MATCH SCORE */   {      score = 1;   }      else score = 0;
res[0] = determine_match_score( c1 + 1, c2 + 1 );   res[0] += score;   res[1] =
determine_match_score(c1 , c2 + 1); res[2] = determine_match_score(c1 + 1, c2); temp =
0;   for (i = 0; i < 3; i++)   {      if (res[i] > temp) temp = res[i];
    } return temp;
}main( ) {
    int score;   score = determine_match_score( "LABCDEF", "ABDEFXXXX");   printf(
"%d\n", score); /* Will be 5 */ }
```

The code above determines if the character string LABCDEF matches with the character string ABDEFXXXX, and the technique is useful to illustrate that a change in the code may have added or deleted characters and/or tokens in front of, in between, or behind the matching sequence of characters and/or tokens. This particular code is intended to evaluate permutations of matching in order to achieve the highest matching score while still retaining the order of the characters and/or tokens. Of course, when evaluating a string of tokens using the techniques above, it is preferred that the values of the tokens be weighted. In addition to matching a certain number of tokens, the matchmaker and announcer as described herein may match programming statements and structures such as blocks, particular statements, or even routines.

When the matchmaker determines that related or derivative segments of code are matching, the match may be registered as related/derivative code in the repository. This information may then be used in the future when changes are made to one or more of the sections of code. The announcer could be programmed to automatically notify the owner of the related/derivative code of ongoing changes during the development of the code. Thus, any fixes and/or bugs in one code is easily propagated to all similar sections of code. Such a feature is useful in any software environment, but especially in an IDE.

To announce that a change was made, the announcer as described herein offers an invitational mode. Owners of source files that were determined to match are notified when the matchmaker first identifies the files as matching. The owners may have an option to opt out of further notification of changes made to particular related sections to effectively say, "although my code may look like your code, please do not notify me of changes." Alternatively, the repository can post the changes to code and highlight or otherwise point to the related/derivative code that might also benefit from the change.

In the long run, simply by making developers conscious of these related sections, the techniques described herein helps them to understand the code and the result will be better fixes and higher quality applications. In some implementations, developers can temporarily ignore an announcement of a change, but request or maintain notification in the future. In addition to propagating fixes, the principles and features discussed herein will enable other programmers to see the changes or fixes and possibly spot problems with the changes. In addition, the constructor feature herein can evaluate the size of the related sections and determine which variables and the number of variables having values that were imported into the section of code. Using this information the invention can make suggestions for new routines that may be useful, as discussed earlier.

Thus, advantageously, a developer who writes and modifies computer programs is able to determine if other sections of code contain a related or a derived section of code similar to one that has been recently modified. The developer is then able to determine if the modifications are significant, and if so, whether any other developer using related or derived code should be notified of the changes. Developers no longer need to step through hundreds of lines of code to find what code should be modified; rather by using the several embodiments of the invention as described herein, the modification will find the user. The constructor, matchmaker, and announcer may be applicable to programs written in Java programming language but this should not imply that the invention is limited to Java, C++ or other object-oriented languages. The invention also functions with procedural programming languages, such as Report Program Generator (RPG), Cobol and Fortran, as well as with functional programming languages, such as LISP, and other languages.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

The embodiments of the invention in which an exclusive property or privilege is claimed are defined as follows:

1. An algorithm to improve efficiency of editing source code, comprising
   recognizing that a source code has been edited;
   identifying a program construct having the edited source code;
   constructing a construct list of at least one other construct having derived and/or related code to the program construct;
   comparing the at least one other construct with the program construct having the edited source code; and
   if, in response to comparing the at least one other construct with the program construct, a commonality between the at least one other construct and the program construct is found to be equal to or beyond a threshold of similarity, then notifying a user responsible for the at least one other construct that the source code of the program construct has been edited.

2. The efficiency algorithm of claim 1, wherein identifying the program construct further comprises parsing tokens of the edited source code.

3. The efficiency algorithm of claim 1, wherein constructing a construct list further comprises determining that the at least one other construct is of at least a threshold size for placement in the construct list.

4. The efficiency algorithm of claim 3, further comprising parsing a sequence of tokens from each of a plurality of constructs of the at least threshold size.

5. The efficiency algorithm of claim 4, wherein comparing the at least one other construct with the program construct further comprises comparing the parsed tokens of the edited source code with parsed tokens of each of a plurality of constructs in the construct list.

6. The efficiency algorithm of claim 5, wherein comparing the parsed tokens further comprises weighting the compared tokens to establish a degree of similarity.

7. The efficiency algorithm of claim 6, further comprising summing the weights of the compared tokens to determine if the sum is equal to or beyond the threshold of similarity.

8. The efficiency algorithm of claim 1, further comprising storing the construct list.

9. The efficiency algorithm of claim 1, wherein the efficiency algorithm is a machine-implemented process in an integrated development environment.

10. An efficiency algorithm to improve efficiency of editing source code, comprising
    recognizing that a source code has been edited;
    identifying a program construct having the edited source code and parsing tokens of the edited source code;
    constructing a construct list of at least one other construct of at least a minimal threshold size having related code by parsing a sequence of tokens from each of a plurality of constructs of the at least minimal threshold size;
    comparing the parsed tokens of the edited source code with the parsed tokens of each of the plurality of constructs in the construct list, and weighting the compared tokens;
    summing the weights of the compared tokens to determine if the sum is equal to or beyond a threshold of similarity, and if so, then determining if a user responsible for the at least one other construct is to be notified; and
    storing the construct list.

11. A method of determining if two or more constructs in a repository of source code in an integrated development environment are related to each other, said method comprising the steps of:
    identifying a first construct;
    parsing N tokens of the first construct, N being a positive integer;
    identifying a plurality of other constructs in the repository;
    parsing M tokens of each one of the other constructs, where M=N;
    comparing the M tokens of each one of the other constructs with the N tokens of the first construct;

determining a weight for each one of the N and M tokens based on name, type, and/or representation;

summing the weights of the N and M tokens;

determining whether the sum of the weights of the M tokens meets or exceeds a threshold of similarity, the threshold of similarity being based on a percentage of the sum of the weights of the M tokens to the sum of the weights of the N tokens; and identifying each construct whose sum of the weights of the M tokens meets or exceeds the threshold of similarity as being related to the first construct.

12. The method of claim 11, wherein the step of identifying the first construct further comprises the step of identifying whether a source code within which resides the first construct has been edited.

13. The method of claim 11, further comprising storing a pointer to each construct identified as being related to the first construct in a construct list of related constructs.

14. The method of claim 13, further comprising the step of identifying users responsible for each of the constructs in the construct list.

15. The method of claim 14, further comprising the step of offering notification to each user responsible for each one of the constructs in the construct list.

16. An integrated development environment, comprising:

a repository of source code into which programs in the integrated development environment are stored;

a constructor to determine, when executed by a processor, whether a construct in an edited program has been edited;

a construct list within the repository into which all constructs that are derived and/or related to the edited construct are listed;

a parser to parse the edited construct and the derived and/or related constructs, when executed by a processor;

a matchmaker to determine, when executed by a processor, all the constructs that are derived and/or related to the edited construct and to enter all constructs determined to be derived and/or related to the edited construct in the construct list; and an announcer to notify, when executed by a processor, any of a plurality of programmers accessing the integrated development environment that the edited construct has been edited and the constructs that are derived and/or related to the edited construct.

17. The integrated development environment of claim 16, further comprising listing within the construct list all source code derived from the edited construct and/or any of the other constructs in the construct lists derived and/or related to the edited construct.

18. An article of manufacture, comprising a data storage medium tangibly embodying a program of machine readable instructions executable by an electronic processing apparatus to perform method steps for operating an electronic processing apparatus, said method steps comprising the steps of:

determining that a source code has been edited in an environment of computer program development;

determining if the edited source code is within a construct of a size of a particular range;

parsing the construct having the edited source code if the edited source is within a construct of the size of the particular range;

finding and parsing other constructs in the environment having a size within the particular range;

creating a construct list of other constructs in the environment having a size within the particular range;

comparing tokens of the construct having the edited source code with tokens of the other constructs in the construct list; and determining that the construct having the edited source code is related to any one of the constructs in the construct list if the tokens of any one of the constructs in the construct list equal the tokens of the construct having the edited source code.

19. The article of manufacture of claim 18, further comprising weighting the compared tokens based on value, type, and/or representation.

20. The article of manufacture of claim 18 wherein said method steps further comprises the step of notifying a user responsible for of any one of the constructs in the construct list that is determined to be related to the construct having the edited source code that the source code of the construct has been edited.

21. The article of manufacture of claim 18, further comprising at least one construct list of related and/or derived constructs within the integrated development environment.

* * * * *